Patented Mar. 8, 1927.

1,620,074

UNITED STATES PATENT OFFICE.

LUDWIG J. CHRISTMANN, OF NEW YORK, N. Y., ASSIGNOR TO AMERICAN CYANAMID COMPANY, OF NEW YORK, N. Y., A CORPORATION OF MAINE.

LACTONITRILE FUMIGANT.

No Drawing.   Application filed August 3, 1925. Serial No. 48,005.

This invention relates to insecticides, more particularly to compositions of toxic character containing substances having cyanogen groups.

Fumigation with cyanogen containing substances has attained considerable commercial importance in recent years. For example, hydrocyanic acid is now used in large quantities in the citrus fields, being sprayed or atomized in the liquid form beneath tents which temporarily cover the trees. This method is effective in destroying insect pests, but it involves the use of a large number of expensive tents and a considerable amount of labor is necessary to move the same from tree to tree. A relatively large investment is required for a plant for the production of liquid hydrocyanic acid and for the heavy, drawn steel cylinders for the transportation and storage thereof.

Another method, which is still more recent, involves the use of a composition which is generally considered to contain calcium cyanide mixed with other substances. This material is capable of reacting with the moisture of the air, rapidly liberating gaseous hydrocyanic acid, which kills the insects and other pests. To a certain extent this material has advantages over liquid hydrocyanic acid in that it does not require an expensive plant or equipment to apply the same for fumigation. However, it cannot be made to readily adhere to shrubs and trees and it, therefore, has not replaced the liquid hydrocyanic acid for plant fumigation.

The present invention is intended to obviate the disadvantages and limitations of the prior methods, it being among the objects thereof to devise a composition capable of liberating hydrocyanic acid in toxic concentrations, which may be readily made without the necessity of expensive equipment, which may be applied to trees and the like without the use of tents or other enclosures and which shall be effective for the destruction of insect and other pests.

In practicing my invention I provide an organic compound containing a cyanogen group, which is capable of decomposing with the liberation of toxic cyanogen gases. I have found that compounds of the cyanhydrin type are particularly effective in that they tend to liberate gaseous hydrocyanic acid. Among those compounds, lactonitrile is very effective and I will describe my invention as involving this substance.

I make a mixture of lactonitrile and water usually in equal parts and to the same I add a carrier material which will not react with the lactonitrile and which is capable of causing the mixture of lactonitrile and water to adhere to surfaces upon which it is projected. I have experimented with a considerable number of substances for this purpose but I have found that the well known soap-bark containing a high percentage of saponin is eminently suitable as a carrier for the lactonitrile. It has the adhesive power necessary to cause the lactonitrile to adhere to the objects upon which it is sprayed, it is neutral to lactonitrile, that is, it does not tend to decompose the compound, and homogeneous mixtures in various proportions may be readily made. A mixture which operates successfully consists of 50 parts of lactonitrile, 50 parts of water and 25 parts of soap-bark (saponin). The mixture is stable and does not lose its toxic value on long storage. When it is desired to fumigate with this composition, I mix 100 parts of water with the same and spray the fumigant upon the trees or shrubs or other objects to be fumigated, the soap-bark causing the composition to adhere to the said objects and the lactonitrile probably slowly giving up gaseous hydrocyanic acid, which diffuses in toxic concentrations over a circumscribed area and kills insects and other pests.

Lactonitrile represents an equilibrium system between lactonitrile, acetaldehyde and hydrocyanic acid in accordance with the following equation:

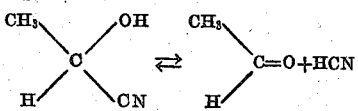

in which, at 25° C., the acetaldehyde and hydrocyanic acid combine to the extent of 99.5%. After spraying a solution of lactonitrile, by reason of the ready volatility of the hydrocyanic acid, the equilibrium is disturbed and the above reaction goes fairly rapidly to the right, soon liberating the entire cyanogen content in the form of hydrocyanic acid. On the other hand, it is well known that, in the presence of alkalis the lactonitrile will form alkali metal cyanide, so that if the insect breathes the vapors of lactonitrile and this is absorbed, and if the body fluid is alkaline, as is the blood of mammals, the formation of an alkali metal cyanide would take place and the death of the insect would be caused thereby.

I have found that other organic cyanogen compounds may be used in place of the lactonitrile, such as methylethylketonecyanhydrin, acetonecyanhydrin, benzyl cyanide, benzoylcyanide and others, but those compounds having the general cyanhydrin structure

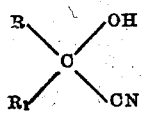

where R and $R_1$ are hydrogen or an alkyl radicle, give the best results. I conducted a series of experiments in order to test the toxicity of the various compounds of the above mentioned types in which 25 grain weevils were placed in a one gallon container and the calculated equivalent amounts of various mixtures, in terms of hydrocyanic acid content, were inserted. The weevils were exposed to the action of the fumigant for thirty minutes, after which a gentle current of air was blown through the containers for sixty minutes and the number of weevils moving after the aeration was recorded. The results were based upon the kill obtained by the use of hydrocyanic acid gas, which killed 10 out of 25 grain weevils, which kill was arbitrarily taken as 100, and the relative toxicities of the various substances used was called the HCN coefficient.

| Compound. | Weevils moving after 30-minutes' fumigation. | Weevils moving after 60-minutes' aeration. | Dead weevils per 100. | HCN coefficient. |
|---|---|---|---|---|
| HCN | 1 | 15 | 40 | 100 |
| Acetaldehyde cyanhydrin | 12 | 0 | 100 | 250 |
| Acetone cyanhydrin | 3 | 14 | 44 | 110 |
| Methylethyl-ketonecyanhydrin | 6 | 5 | 80 | 200 |
| Benzylcyanide | 23 | 7 | 72 | 180 |
| Benzoylcyanide | 0 | 6 | 76 | 190 |

It will be noted that the most toxic compound of those tested is lactonitrile with an HCN coefficient of 250.

These mixtures may be applied by any suitable type of spraying apparatus in the same manner as other spraying mixtures. If desired, the lactonitrile-saponin mixtures may be combined with other toxic spray material such as calcium arsenate, sulphur and the like, but care must be taken that the materials mixed therewith are neutral to the lactonitrile, since it is easily decomposed by alkalis and acids. My new fumigant may be used with safety by the ordinary operator without any special precautions, such as are necessary in handling hydrocyanic acid. The amount of decomposition of the lactonitrile, especially in the presence of the saponin or its equivalent, is practically negligible while in the liquid state, thus constituting a safe material, which may be handled as any innocuous liquid and sprayed in the same manner as the ordinary well known spray materials. My fumigant does not injure plants, even those which are fairly sensitive to the action of most insecticides, such as the peach tree, which is not affected when sprayed with as high as a 10% solution of lactonitrile-saponin solution, whereas the solution is highly toxic to insects. It is probable that the saponin has a protective action on the plant while it does not hinder the evolution of hydrocyanic acid from the fumigant. These mixtures have the further advantage of being fumigants, that is, killing by the liberation of gas, and being stomach poisons and contact poisons as well.

It is not essential in my invention to use soap-bark, as other substances of a similar nature may be substituted therefor, provided they are of a non-alkaline, saponaceous or adhesive character and do not have a tendency to decompose the organic cyanogen containing fumigant. The proportions of the ingredients may be varied within wide limits with good results. These and other changes may be made in my invention without departing from the spirit thereof, the scope of the invention being defined in the claims appended hereto.

What I claim is:

1. An insecticide comprising a stable mixture of an organic cyanogen compound and a non-alkaline, saponaceous adhesive material.

2. An insecticide comprising a stable mixture of an organic cyanogen compound, a non-alkaline, saponaceous adhesive material, and water.

3. An insecticide comprising a stable mixture of a cyanhydrin and a non-alkaline, saponaceous adhesive material.

4. An insecticide comprising a stable mixture of a cyanhydrin, a non-alkaline, saponaceous adhesive material, and water.

5. An insecticide comprising a stable mixture of lactonitrile and a non-alkaline saponaceous adhesive material.

6. An insecticide comprising lactonitrile, a non-alkaline, saponaceous material, and water.

7. An insecticide comprising lactonitrile and saponin.

8. An insecticide comprising lactonitrile, saponin, and water.

9. An insecticide comprising about 50 parts of lactonitrile, about 50 parts of water, and 25 parts of saponin.

In testimony whereof, I have hereunto subscribed my name this 29th day of July, 1925.

LUDWIG J. CHRISTMANN.